(12) United States Patent
Sugiyama et al.

(10) Patent No.: US 11,316,785 B2
(45) Date of Patent: Apr. 26, 2022

(54) RELAY SYSTEM, RELAY DEVICE, AND NON-TRANSITORY COMPUTER READABLE MEDIUM

(71) Applicant: FUJIFILM Business Innovation Corp., Tokyo (JP)

(72) Inventors: Ichiro Sugiyama, Kanagawa (JP); Ayumi Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 177 days.

(21) Appl. No.: 16/741,771

(22) Filed: Jan. 14, 2020

(65) Prior Publication Data
US 2021/0014160 A1    Jan. 14, 2021

(30) Foreign Application Priority Data
Jul. 11, 2019 (JP) .............................. JP2019-129411

(51) Int. Cl.
| | |
|---|---|
| *H04L 12/46* | (2006.01) |
| *G06F 15/173* | (2006.01) |
| *H04L 12/707* | (2013.01) |
| *H04W 60/00* | (2009.01) |
| *H04L 45/00* | (2022.01) |
| *H04L 47/10* | (2022.01) |

(52) U.S. Cl.
CPC .............. *H04L 45/54* (2013.01); *H04L 47/10* (2013.01)

(58) Field of Classification Search
CPC ..... H04L 45/54; H04L 12/6418; H04L 45/28; H04L 45/66; H04L 45/245; H04L 45/02; H04L 45/38; H04L 67/28; H04L 47/10; H04L 45/22; H04L 63/0272; H04L 45/50; H04W 40/14; H04W 60/005; H04W 40/28
USPC ........................................................ 370/235
See application file for complete search history.

(56) References Cited

U.S. PATENT DOCUMENTS

| | | | | |
|---|---|---|---|---|
| 8,085,755 | B2 * | 12/2011 | Shepherd ................ | H04L 45/16 370/351 |
| 8,868,745 | B1 * | 10/2014 | Muley ..................... | H04L 45/02 709/226 |
| 10,187,289 | B1 * | 1/2019 | Chen ....................... | H04L 45/02 |

(Continued)

FOREIGN PATENT DOCUMENTS

JP    2017-034321    2/2017

*Primary Examiner* — Edan Orgad
*Assistant Examiner* — Vanneilian Lalchinthang
(74) *Attorney, Agent, or Firm* — JCIPRNET

(57) ABSTRACT

A relay system includes a first relay device, a second relay device, a controller, and a route advertisement unit. The second relay device receives route advertisement from the first relay device. If an excess of a number of pieces of routing information registered in a routing table of the second relay device over a maximum number of pieces of routing information registrable in the routing table is predicted, the controller controls a number of pieces of routing information that are to undergo the route advertisement from the first relay device to the second relay device. The route advertisement unit performs the route advertisement to the second relay device after excluding, from pieces of routing information registered in a routing table of the first relay device, a piece of routing information set not to undergo the route advertisement as a result of the control of the number of pieces of routing information by the controller.

19 Claims, 6 Drawing Sheets

(56) References Cited

U.S. PATENT DOCUMENTS

| | | | |
|---|---|---|---|
| 10,383,027 B1* | 8/2019 | Sivaraj | H04L 67/28 |
| 2010/0036891 A1* | 2/2010 | Matsushita | G06F 16/217 |
| | | | 707/602 |
| 2013/0219082 A1* | 8/2013 | Mitomi | H04L 45/42 |
| | | | 709/244 |
| 2014/0328338 A1* | 11/2014 | Ueda | H04L 45/04 |
| | | | 370/338 |
| 2018/0123867 A1* | 5/2018 | Balasubramanian | H04L 45/28 |
| 2019/0028377 A1* | 1/2019 | Yamazaki | H04L 43/50 |
| 2019/0109780 A1* | 4/2019 | Nagarkar | H04L 45/02 |
| 2020/0336420 A1* | 10/2020 | Joshi | H04L 45/74 |
| 2020/0412645 A1* | 12/2020 | Semwal | H04L 61/00 |
| 2021/0029028 A1* | 1/2021 | Masurekar | H04L 49/354 |

* cited by examiner

FIG. 2

| TRANSMISSION ADDRESS | NEXT HOP ADDRESS | ADVERTISEMENT INEXECUTION FLAG | ROUTING CONTROL INEXECUTION FLAG | PRIORITY | . . . |
|---|---|---|---|---|---|
| 192. 168. 1. 0/24 | 192. 168. 1. 20 | 0 | 0 | | |
| 192. 168. 10. 0/24 | 192. 168. 10. 4 | 0 | 0 | | |
| 192. 168. 100. 0/24 | 192. 168. 0. 0 | 1 | 0 | | |
| 192. 168. 100. 15/24 | 192. 168. 200. 0 | 1 | 1 | | |
| . . . | | | | | |
| 0. 0. 0. 0/0 | 192. 168. 128. 0 | 0 | | 2 | |
| 0. 0. 0. 0/0 | 192. 168. 255. 255 | 0 | | 1 | |

FIG. 3

| SESSION ID | SENDER ADDRESS | DESTINATION ADDRESS | TRAFFIC [Mbps] | |
| --- | --- | --- | --- | --- |
| | | | UPLINK | DOWNLINK |
| S0001 | 192.123.123.0 | 192.123.1.1 | 10 | 300 |
| S0002 | 192.123.123.1 | 192.168.20.1 | 500 | 200 |
| S0003 | 192.123.123.5 | 192.123.3.3 | 400 | 50 |
| S0004 | 192.123.123.100 | 192.168.100.15 | 5 | 20 |
| ... | | | | |

RELAY SYSTEM, RELAY DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-129411 filed Jul. 11, 2019.

BACKGROUND

(i) Technical Field

The present disclosure relates to a relay system, a relay device, and a non-transitory computer readable medium.

(ii) Related Art

Routers have a routing function of transferring a received data packet to a network including the destination of the data packet. Each router has a routing table having pieces of routing information registered therein. In each piece of routing information, the network ID of a data destination and an address identifying the destination of a data packet are paired. The router refers to the routing table and thereby decides the transfer destination of the data packet (for example, Japanese Unexamined Patent Application Publication No. 2017-34321).

The reporting of routing information held by a router to a different router is referred to as route advertisement. The routers perform the route advertisement and thereby keep consistency in the respective routing tables.

SUMMARY

The maximum number of pieces of routing information registrable in the routing table of a router is predetermined. Accordingly, an attempt by a relay device to register a large number of pieces of routing information received in the route advertisement from multiple relay devices is likely to cause an excess over the maximum number of pieces of routing information in the routing table of the router. In other words, if a relay device that is to advertise routes performs route advertisement of all of the pieces of routing information registered in its routing table without any special processing, a relay device that is to receive the pieces of routing information is likely to have the excess over the maximum number of routing information in its routing table.

Aspects of non-limiting embodiments of the present disclosure relate to route advertisement control performed to prevent an excess over the maximum number of pieces of routing information registrable in a routing table in a relay device that is a route advertisement destination.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a relay system including a first relay device, a second relay device, a controller, and a route advertisement unit. The second relay device receives route advertisement from the first relay device. If an excess of a number of pieces of routing information registered in a routing table of the second relay device over a maximum number of pieces of routing information registrable in the routing table is predicted, the controller controls a number of pieces of routing information that are to undergo the route advertisement from the first relay device to the second relay device. The route advertisement unit performs the route advertisement to the second relay device after excluding, from pieces of routing information registered in a routing table of the first relay device, a piece of routing information set not to undergo the route advertisement as a result of the control of the number of pieces of routing information by the controller.

BRIEF DESCRIPTION OF THE DRAWINGS

An exemplary embodiment of the present disclosure will be described in detail based on the following figures, wherein:

FIG. 2 is a table illustrating an example data configuration in a routing table in this exemplary embodiment;

FIG. 3 is a table illustrating an example data configuration in a session table in this exemplary embodiment;

DETAILED DESCRIPTION

Hereinafter, an exemplary embodiment of the present disclosure will be described on the basis of the drawings.

Figure 1:
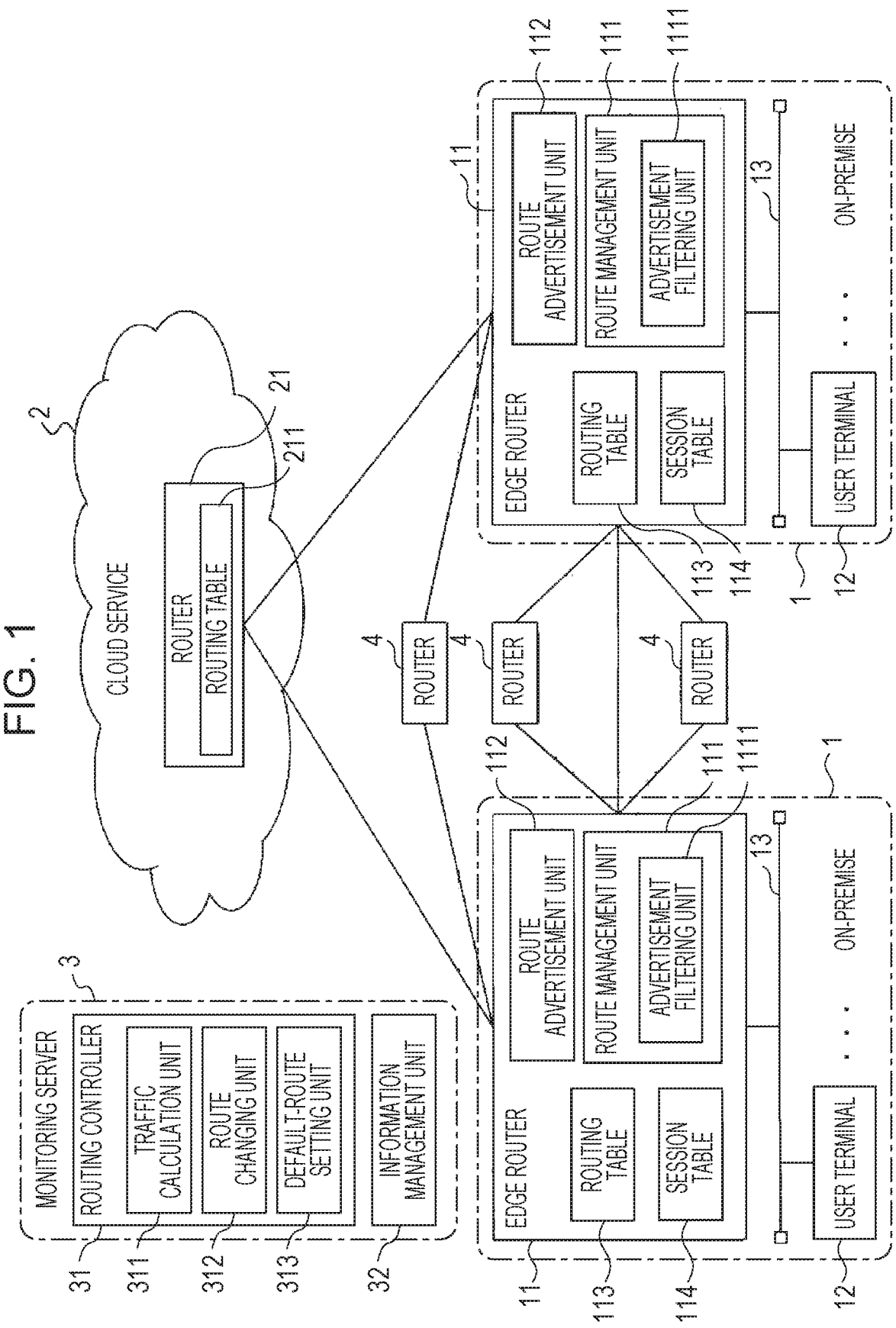
FIG. 1 is a diagram illustrating the overall configuration and the block configuration of a relay system according to the present disclosure.

FIG. 1 is a diagram illustrating the overall configuration and the block configuration of a network system in this exemplary embodiment. FIG. 1 illustrates an example system configuration in which a relay system according to the present disclosure is applied to a network system including on-premise intranet systems 1 and a cloud service 2 that are connected via a virtual private network (VPN) and further including a monitoring server 3. Note that each intranet system 1 has the same configuration and thus is denoted by the same reference numeral. FIG. 1 illustrates the intranet systems 1 in two premises; however, the number of premises is not limited to this and may be one or more.

Each intranet system 1 includes an edge router 11 and a user terminal 12 that are connected via a network 13 such as a LAN. The edge router 11 is one of modes of a relay device having a routing function. The edge router 11 in this exemplary embodiment supports a full-mesh network topology and is not only connected to the edge router 11 installed in a different intranet system 1 and a router 21 in the cloud service 2 but also directly connected to a router 4 that is a different router. The edge router 11 in this exemplary embodiment may have the same hardware configuration as that in the related art and has a computer incorporated therein and including a CPU, a ROM, a RAM, a memory, a communication unit, and the like. The user terminal 12 is an information processing apparatus used by a user using a cloud service and may be implemented by an existing general-purpose hardware configuration such as a personal computer (PC).

The edge router 11 corresponds to a relay device according to the present disclosure and, as illustrated in FIG. 1, includes a route management unit 111, a route advertisement unit 112, a routing table 113, and a session table 114. Note that components not used for the explanation in this exemplary embodiment are omitted in FIG. 1.

The route management unit 111 manages routing information registered in the routing table 113 in cooperation with a routing controller 31 in the monitoring server 3. An advertisement filtering unit 1111 included in the route management unit 111 sets a piece of routing information extracted not to be advertised (a route advertisement inexecution target) in the routing table 113 as the route advertisement inexecution target. In this exemplary embodiment, setting a piece of routing information registered in the routing table 113 as the route advertisement inexecution target is referred to as filtering. The route advertisement unit 112 performs the route advertisement of pieces of routing information registered in the routing table 113 to the different routers 4, 21, and 11. At least when performing the route advertisement to the router 21, the route advertisement unit 112 in this exemplary embodiment excludes, from the pieces of routing information registered in the routing table 113 and then performs the route advertisement, the pieces of routing information set not to undergo the route advertisement by the advertisement filtering unit 1111 under the control of the number of pieces of routing information by the routing controller 31 of the monitoring server 3.

FIG. 2 is a table illustrating an example data configuration in the routing table 113 in this exemplary embodiment. In the routing table 113, pieces of routing information are registered and set on a per route basis. The routing information is also referred to as an entry to the routing table 113, and the maximum number of pieces of routing information registrable in the routing table 113 is predetermined. The routing information handled in this exemplary embodiment at least includes a transmission address, a next hop address, an advertisement inexecution flag, a routing control inexecution flag, and priority. The transmission address is an IP address of an apparatus that is a transmission destination of a data packet to be transmitted from the user terminal 12 to the outside. The next hop address is the IP address of a relay device such as a router that relays the data packet. The advertisement inexecution flag, the routing control inexecution flag, and the routing control inexecution flag and the priority are information items characterized in this exemplary embodiment. Among these, the advertisement inexecution flag is flag information set in a piece of routing information that is not to undergo the route advertisement. The routing control inexecution flag is flag information set in a piece of routing information that is not to be referred to at the time of routing control based on the piece of routing information. Multiple default routes are registrable and settable in the routing table 113 in this exemplary embodiment, and the priority is set for the default routes.

FIG. 3 is a table illustrating an example data configuration in the session table 114 in this exemplary embodiment. The session table 114 is used for managing a session established between apparatuses that perform communications (for example, the user terminals 12). The session is managed by a session management unit (not illustrated). The session table 114 at least includes a session ID for identifying a session, a sender address, a destination address, and traffic. The sender address is the IP address of one of apparatuses that belongs to the intranet system 1 of the apparatuses that establish the session. The destination address is the IP address of one of apparatuses that is located outside the intranet system 1 of the apparatuses that establish the session. The traffic is the traffic of data exchanged between the apparatuses that establish the session. In this exemplary embodiment, uplink traffic and downlink traffic are separately managed. The uplink traffic is traffic of data transmitted from the transmission source to the destination, and the downlink traffic is the traffic of data transmitted from the destination to the transmission source. The data configuration of an existing session table may still be used as the data configuration of the session table 114 in this exemplary embodiment.

The route management unit 111 and the route advertisement unit 112 in the edge router 11 are implemented by cooperative operation between the computer installed in the edge router 11 and programs run by the CPU included in the computer. The routing table 113 and the session table 114 are implemented by the memory or the RAM included in the edge router 11.

The cloud service 2 provides users of the on-premise intranet system 1 in the VPN connection with predetermined services. The cloud service 2 is implemented by one or more servers and has the router 21 that further receives routing information having undergone the route advertisement from the edge router 11 and registers and sets the routing information in a routing table 211 therein. The routing table 211 may have the same data configuration as an existing data configuration. The maximum number of registrable pieces of routing information is predetermined.

The monitoring server 3 may be implemented by an existing general-purpose server computer. That is, the monitoring server 3 is composed of a computer including a CPU, a ROM, a RAM, a memory, a communication unit, and the like. The monitoring server 3 monitors the number of pieces of routing information registered in the routing table 211 of the cloud service 2 and each routing table 113 of the corresponding edge router 11 and controls a relay process in the routing table 113 in cooperation with the route management unit 111. The monitoring server 3 includes the routing controller 31 and an information management unit 32. The edge router 11 that is a first relay device performs the route advertisement to the router 21 of the cloud service 2 that is a second relay device. If an excess of the number of pieces of routing information registered in the routing table 211 of the router 21 over the maximum number of pieces of routing information registrable in the routing table 211 is predicted, the routing controller 31 controls the number of pieces of routing information that are to undergo the route advertisement from the edge router 11 to the router 21. The routing controller 31 includes a traffic calculation unit 311, a route changing unit 312, and a default-route setting unit 313. The traffic calculation unit 311 acquires the traffic of each session from each session table 114 of the corresponding edge router 11 and calculates traffic for each piece of routing information from the acquired traffic. In cooperation with the route management unit 111 of the edge router 11, the route changing unit 312 changes, to a route via a default route, a route used in the session using a piece of routing information decided not to undergo the route advertisement to the router 21 among the pieces of routing information registered in the routing table 113. The default-route setting unit 313 prioritizes default routes registered in the routing table 113 of the edge router 11. In particular, as to be described in detail later, the default-route setting unit 313 sets, as a piece of routing information representing the top priority default route, the piece of routing information having the lowest traffic among the pieces of routing information registered in the routing table 113 of the edge router 11, depending on the situation. The information management unit 32 manages information log regarding prediction of the excess of the number of pieces of routing information registered in the router 21 over the maximum number of pieces of routing information registrable in the routing table 211.

The routing controller 31 and the information management unit 32 in the monitoring server 3 are implemented by cooperative operation between the computer implementing the monitoring server 3 and programs run by the CPU installed in the computer. Although there is one monitoring server 3 in the configuration in this exemplary embodiment, for example, the function may be divided into functions of multiple respective servers. In addition, the monitoring server 3 is provided outside the on-premise and the cloud service 2 in FIG. 1 but may be provided in one of the on-premise and the cloud service 2.

In addition, programs used in this exemplary embodiment may be provided not only by a communication medium but also in such a manner as to be stored in a computer readable recording medium such as a CD-ROM or a USB memory. The programs provided through the communication medium or the recording medium are installed in the computer and serially run by the CPU of the computer, and thereby various processes are executed.

In the following description, the number of pieces of routing information registered in the routing tables 113 and 211 is also referred to as a route count. Strictly speaking, the number of pieces of routing information that are to undergo the route advertisement among the pieces of routing information registered in the routing tables 113 and 211 is referred to as the route count. In the case of the routing table 113 in this exemplary embodiment, a piece of routing information having an advertisement inexecution flag (described later) set therein is not to undergo the route advertisement and thus is not counted at the time of calculating the route count despite the registration of the routing table 113. In addition, the number of pieces of routing information that are to undergo the route advertisement by the route advertisement unit 112 is referred to as an advertisement count. The advertisement count takes on a value obtained by subtracting the number of pieces of routing information with the advertisement inexecution flag from the route count.

The edge router 11 in this exemplary embodiment regularly performs the route advertisement of the routing information set in the routing table 113 to the router 21 of the cloud service 2 by using the originally provided route advertisement function. The router 21 updates the routing table 211 with the routing information received through the route advertisement performed by each edge router 11. However, a large sum total of the route counts set in the respective routing tables 113, in other words, a large number of totaled pieces of routing information received through the route advertisement performed by the router 21 is likely to cause an excess over the maximum number of pieces of routing information settable in the routing table 211. The excess over the maximum number is likely to cause communication inability. To address such an issue, route aggregation has been proposed. In the route aggregation, multiple networks (subnets, minutely) are aggregated into one, in other words, the multiple entries are aggregated into one entry. This enables the route count in the routing table 113 to be reduced and thus also the count of advertisements to the router 21 to be reduced.

However, performing the route aggregation possibly leads to route concentration on a relay device identified from the next hop address. Route concentration on a specific router leads to an increase in network load on the router and also an increase in influence of a failure occurring on the route to the router, if any.

Hence, in this exemplary embodiment, if the excess of the route count in the routing table 211 of the router 21 over the maximum number of pieces of routing information registrable in the routing table 211 (hereinafter, referred to as the maximum number of entries) is predicted, the count of advertisements from the edge router 11 to the router 21 is controlled. Specifically, the advertisement count is reduced.

In the related art, the count of advertisements from the edge router 11 to the router 21 is equal to the route count in the routing table 113; however, in this exemplary embodiment, the count of advertisements from the edge router 11 to the router 21 is made less than the route count in the routing table 113, and thereby the total number of advertisements received by the router 21 may be reduced. This enables the possibility of the excess over the maximum number of entries in the routing table 211 to be lowered.

To execute a process for reducing the advertisement count characteristic to this exemplary embodiment as described above, first to fourth thresholds are set in advance in the monitoring server 3 in this exemplary embodiment. The first to fourth thresholds each have a value smaller than the maximum number of entries in the routing table 211. The first and third thresholds are set for the edge router 11, and the second and fourth thresholds are set for the router 21. The third threshold has a value larger than that of the first threshold, and the fourth threshold has a value larger than that of the second threshold. Values as the respective thresholds are appropriately set, for example, in such a manner that a network administrator or the like refers to the maximum numbers of entries in the routing tables 113 and 211.

Figure 4A:
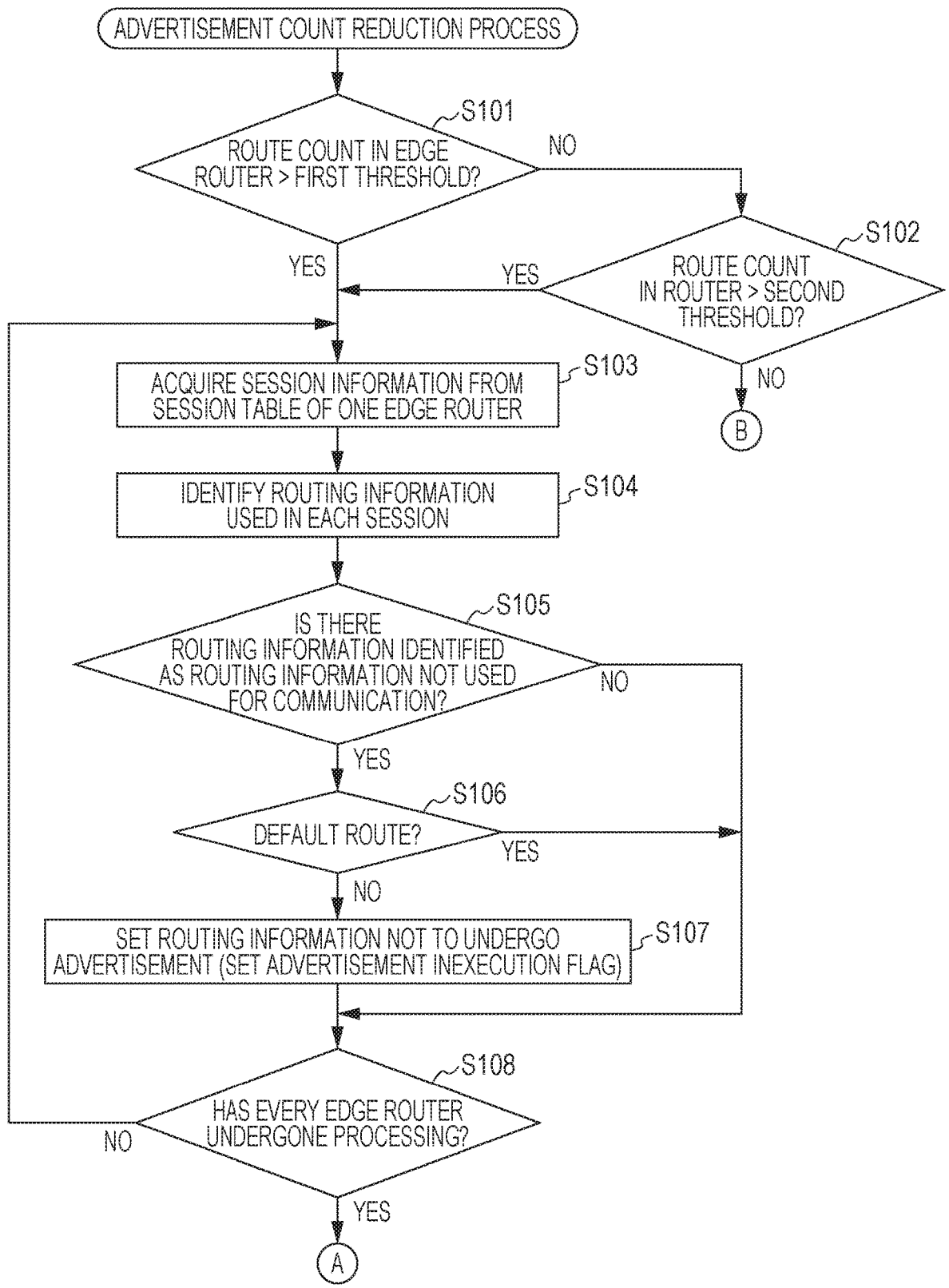
FIG. 4A is a flowchart illustrating an advertisement count reduction process in this exemplary embodiment.
Figure 4B:
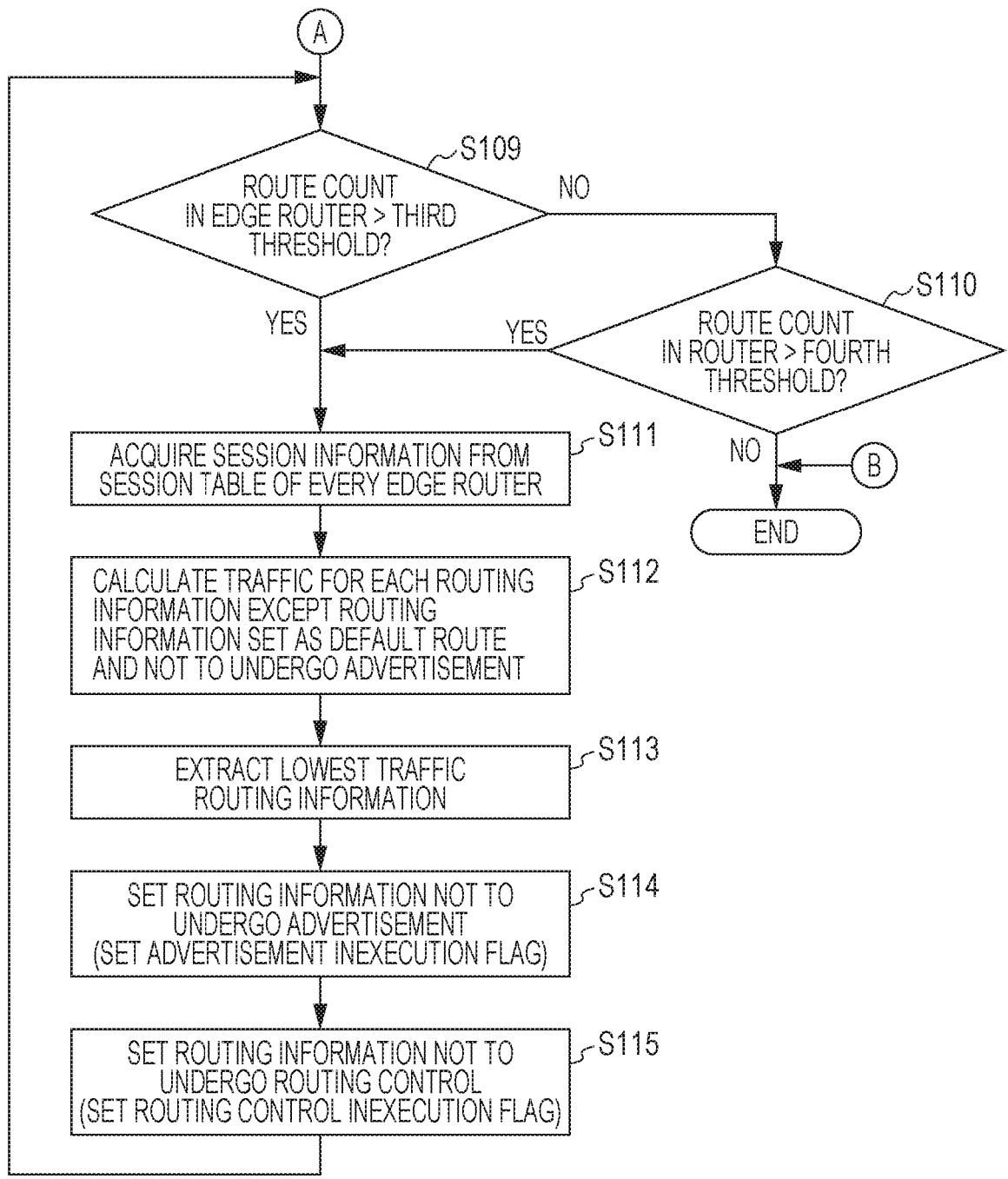
FIG. 4B is a flowchart continued from FIG. 4A.

Hereinafter, an advertisement count reduction process in this exemplary embodiment will be described by using flowcharts illustrated in FIGS. 4A and 4B. The advertisement count reduction process is regularly executed in such a manner that the routing controller 31 in the monitoring server 3 takes the initiative. For example, the advertisement count reduction process may be executed immediately before performing the route advertisement. The monitoring server 3 is capable of referring to the setting details of the routing table 211 of the router 21, each routing table 113 of the corresponding edge router 11, and the session table 114. For example, the monitoring server 3 acquires needed information such as by inquiring the route management unit 111.

If the route count in the routing table 113 of every edge router 11 is lower than or equal to the first threshold (NO in step S101), and if the route count in the routing table 211 of the router 21 is lower than or equal to the second threshold (NO in step S102), the routing controller 31 terminates the process on the basis of the following projection. Even if every edge router 11 performs the route advertisement of all of the entries in the routing table 113 to the router 21, and even if the entries are reflected on the routing table 211, the route count in the routing table 211 does not exceed the maximum number of entries. In this case, the advertisement count reduction process is not executed until the next scheduled time.

In contrast, if the route count in at least one routing table 113 exceeds the first threshold (YES in step S101), or if the route count in the routing table 211 exceeds the second threshold even if the route count in every routing table 113 is lower than or equal to the first threshold (YES in step S102), the routing controller 31 makes a projection that if every edge router 11 performs the route advertisement of all of the entries in the routing table 113 to the router 21, and if the entries are reflected on the routing table 211, the route count in the routing table 211 is likely to exceed the maximum number of entries. As described above, if the excess of the route count in the routing table 211 over the maximum number of entries is predicted, the routing controller 31 performs processing as below. Note that the routing controller 31 reports, to the information management unit 32, the situation in which the excess of the route count in the routing table 211 over the maximum number of entries is predicted. The reported information may include the state or the like of each entry in the routing table 211 and the routing table 113 for analysis, and the analysis may be utilized for network environment improvement. In addition, the information management unit 32 may report the information to network administrators for the cloud service 2 and the intranet system 1.

Since the excess of the route count in the routing table 211 over the maximum number of entries is predicted in this case, the following processing is preferably performed on not only the routing table 113 having routing information having the route count exceeding the first threshold but also on all of the routing tables 113.

First, the routing controller 31 acquires pieces of information (hereinafter, session information) regarding all of sessions registered in the session table 114 of the edge router 11 not having undergone the process (step S103). The routing controller 31 collates a destination address included in each of the acquired pieces of session information with each transmission address in the routing table 113 and thereby identifies a piece of routing information used in the session for communication (step S104).

This processing enables discrimination between a piece of routing information used for communication and a piece of routing information not used for communication. Note that a piece of routing information not used for communication in any session is registered in the routing table 113 but actually is not used at present. Accordingly, even if the piece of routing information is deleted from the routing table 113, there is no blocked session. Hence, if there is a piece of routing information identified as a piece of routing information not used for communication (YES in step S105 and NO in step S106), the piece of routing information is deleted. Specifically, the advertisement filtering unit 1111 sets an advertisement inexecution flag in the piece of routing information in the routing table 113 in accordance with the instruction from the routing controller 31 (step S107). In this exemplary embodiment, a flag value of 1 is set. The piece of routing information having the advertisement inexecution flag set therein is thereby set not to undergo route advertisement by the route advertisement unit 112, and thus the count of advertisements from the edge router 11 to the router 21 is reduced. Even if the router 21 in the cloud service 2 does not receive the advertisement of the piece of routing information not used for the communication, the router 21 does not perform routing by using the piece of routing information, and thus communication failure occurrence is eliminated.

However, if the piece of routing information identified in step S104 represents a default route (YES in step S106), there is a possibility of communication inability in any of subsequent established sessions, and thus the default route is not deleted. That is, the advertisement inexecution flag is not set for the default route.

Processing in steps S103 to S107 as described above is repeated until every edge router 11 undergoes the processing (NO in step S108). If the processing is performed on every edge router 11 (YES in step S108), the processing moves to step S109.

The above-described processing is performed on every edge router 11 in this exemplary embodiment; however, for example, every time one edge router 11 undergoes the above-described processing, it may be projected whether the route count in the routing table 211 is likely to exceed the maximum number of entries (steps S101 and S102). When it is projected that the route count is not to exceed the maximum number of entries, the above-described processing may be prevented from being performed on the edge router 11 having not undergone the processing because there is no need for reducing the advertisement count over and above what is wanted. In a case where not all of the edge routers 11 are likely to undergo the processing as described above, the routing controller 31 may perform the above-described processing on the edge routers 11, for example, in descending order of the route count. This is because as the route count is increased, a larger number of pieces of routing information to be set not to undergo route advertisement are likely to be present. In addition, in the comparison between the route count and the first threshold in step S101, steps S103 to S107 may be performed on only one or more edge routers 11 having a route count exceeding the first threshold.

Subsequently, if the route count in the routing table 113 of every edge router 11 is lower than or equal to the third threshold (NO in step S109), and if the route count in the routing table 211 of the router 21 is lower than or equal to the fourth threshold (NO in step S110), the routing controller 31 terminates the process on the basis of the following projection. Even if every edge router 11 performs the route advertisement of all of the entries in the routing table 113 to the router 21, and even if the entries are reflected on the routing table 211, the route count in the routing table 211 does not exceed the maximum number of entries.

In contrast, if the route count in at least one routing table 113 exceeds the third threshold (YES in step S109), or if the route count in the routing table 211 exceeds the fourth threshold even if the route count in every routing table 113 is lower than or equal to the third threshold (YES in step S110), the routing controller 31 makes a projection that if every edge router 11 performs the route advertisement of all of the entries in the routing table 113 to the router 21, and if the entries are reflected on the routing table 211, the route count in the routing table 211 is likely to exceed the maximum number of entries. As described above, if the excess of the route count in the routing table 211 over the maximum number of entries is predicted, the routing controller 31 performs processing as below. Note that the routing controller 31 reports, to the information management unit 32 in the same manner as above, the situation in which the excess of the route count in the routing table 211 over the maximum number of entries is predicted.

In steps S103 to S108 described above, a piece of routing information not used for communication is processed to be set not to undergo the route advertisement. Nevertheless, it is projected that even the use of the third and fourth thresholds respectively having larger values than those of the first and second thresholds does not still prevent the excess of the route count in the routing table 211 over the maximum number of entries. Hence, the processing described below is designed such that even the setting of one or more pieces of routing information used for communication not to undergo the route advertisement brings an end to the projection of the excess of the route count in the routing table 211 over the maximum number of entries.

First, the routing controller 31 acquires every piece of session information registered in the session table 114 in every edge router 11 (step S111). Note that the processing may be performed in such a manner as to use the pieces of session information acquired in step S103. Subsequently, the traffic calculation unit 311 in the routing controller 31 acquires traffic of each session from each session table 114 of the corresponding edge router 11. Among the pieces of routing information registered in each routing table 113, the traffic calculation unit 311 calculates traffic for each piece of routing information except pieces of routing information already set not to undergo the route advertisement, that is, pieces of routing information having the advertisement inexecution flag set therein and the default route set not to undergo route advertisement inexecution (step S112). Since the correspondence between each piece of routing information and communication in the session may be discriminated as described above, the traffic in the session is aggregated for each piece of routing information, and thereby the traffic of the piece of routing information is calculated.

The routing controller 31 extracts, as an inexecution target for the route advertisement to the router 21, the piece of routing information having the lowest calculated traffic (step S113). The advertisement filtering unit 1111 of the edge router 11 having the extracted piece of routing information registered therein sets the advertisement inexecution flag in the extracted piece of routing information in the routing table 113 in accordance with the instruction from the routing controller 31 and thereby sets the piece of routing information as the route advertisement inexecution target (step S114). The route management unit 111 sets the routing control inexecution flag in the extracted piece of routing information under the control of the route changing unit 312 and thereby sets the piece of routing information not to be referred to at the time of routing control (step S115). In this exemplary embodiment, a flag value of 1 is set. The piece of routing information is not used for communication in steps S103 to S108 described above and thus is not referred to at the time of the routing control. Accordingly, it is considered that even inconsistency in entries between the routing table 113 still having the piece of routing information registered therein and the routing table 211 does not cause trouble. However, in steps S111 to S114, the piece of routing information used for communication is set not to undergo the route advertisement, and thus inconsistency in the setting details between the routing table 113 and the routing table 211 is likely to cause trouble.

Hence, in this exemplary embodiment, the routing control inexecution flag is set in the piece of routing information possibly causing the trouble and thereby is not referred to at the time of the routing control. This makes the setting details of the routing table 113 and the routing table 211 substantially the same, and the trouble due to the entry inconsistency does not occur. In the edge router 11, a default route is used as the route for the session of the piece of routing information set not to undergo the routing control. In other words, it may be said that the piece of routing information used for the route using the piece of routing information set not to undergo the routing control is changed to the default route.

The condition for selecting a piece of routing information used for communication as a route advertisement inexecution target does not necessarily have to be limited to the selecting of the above-described piece of routing information having the lowest traffic. However, in this exemplary embodiment, setting the piece of routing information having the lowest traffic not to undergo the route advertisement may minimize an increase in network load on a router identified by the default route.

After the piece of routing information having the lowest traffic is set not to undergo the route advertisement in the above-described manner, the processing moves to step S109.

Steps S111 to S115 described above are repeated until it is projected that the route count in the routing table 211 does not exceed the maximum number of entries. In the processing, the piece of routing information having the lowest traffic at the time among the pieces of routing information to undergo the route advertisement among the pieces of routing information registered in the routing table 113 is changed to the inexecution target for the route advertisement to the router 21. As the result of this, when it is projected that the route count in the routing table 211 does not exceed the maximum number of entries (NO in step S110), the advertisement count reduction process is terminated. Note that step S111 may be performed in such a manner that once the pieces of session information are acquired, the acquired pieces of session information may be used without acquiring the piece of session information every time.

When the piece of routing information having the lowest traffic is extracted in step S113, the sum total of uplink and downlink traffic is regarded as the traffic of each piece of routing information. There may be a case where there are multiple pieces of routing information having the lowest traffic. In this case, one of the pieces of routing information that has the lowest uplink traffic may be extracted. The uplink represents outgoing communication from the intranet system 1 in a range including the cloud service 2. When a user of the intranet system 1 uses the cloud service 2 more frequently than the other services, the uplink traffic is increased. That is, in the case where the cloud service 2 is used frequently, a relevant piece of routing information is less likely to set as a routing control inexecution target. If the route from the user terminal 12 in the intranet system 1 to the cloud service 2 is not set as the routing control inexecution target, the route may be directly connected to the router 21 without using a default route. In this exemplary embodiment, only the uplink traffic is referred to in the case where there are multiple pieces of routing information having the lowest traffic; however, only the uplink traffic may be referred to any time in step S113.

As described above, after a piece of routing information not to undergo route advertisement is selected by executing the advertisement count reduction process, the route advertisement unit 112 excludes the piece of routing information not to undergo the route advertisement and performs the route advertisement, to the router 21, only pieces of routing information to undergo the route advertisement. Since the count of advertisements from the edge router 11 to the router 21 is reduced due to the above-described process, a possibility of the excess of the route count in the routing table 211 over the maximum number of entries, that is, a possibility of the overflow of the routing table 211 may be prevented.

After the end of the above-described advertisement count reduction process, the setting statuses of the advertisement inexecution flag and the routing control inexecution flag in the routing table 113 are initialized by the time the next advertisement count reduction process is executed. Although the result may be inherited to an immediately preceding process without the initialization, it is preferable to initialize the setting statuses every time in consideration of a case of changes in established session configuration and traffic.

In the description above, to handle every edge router 11 equally, every piece of session information registered in the session table 114 of every edge router 11 is acquired in step S111. However, performing the process in this manner leads to a possibility of advertisement count reduction concentration on some edge router 11. Accordingly, to prevent the advertisement count reduction concentration, the following control may be performed. Specifically, processing is performed one by one in order on the edge routers 11, and the piece of routing information having the lowest traffic is set not to undergo the routing control in each edge router 11. The processing may be performed, for example, in descending order of the traffic of the edge router 11. Alternatively, the processing may be performed in ascending order.

This exemplary embodiment is characterized in that the count of advertisements to the router 21 is reduced to thereby prevent the excess of the route count in the routing table 211 over the maximum number of entries. However, the use of the above-described routing control inexecution flag in the routing table 113 results in a state where one or more pieces of routing information not used for the routing control remain in the routing table 113, and thus the use does not lead to the reduction of the route count in the routing table 113. That is, there is a possibility of an excess of the route count in the routing table 113 over the maximum number of entries, depending on the situation.

Hence, a configuration without the routing control inexecution flag may be employed. For example, a save routing table for temporarily moving and saving, from the routing table 113, a piece of routing information not to undergo the routing control may be separately prepared. The piece of routing information not to undergo the routing control is moved to the save routing table, and thereby the number of pieces of routing information in the routing table 113 may be ensured within the entry limit. For pieces of routing information having the advertisement inexecution flag set therein, a save routing table may likewise be prepared separately. Alternatively, the save routing table for the routing control inexecution flag may be used also for the advertisement inexecution flag. The number of pieces of routing information in the routing table 113 may thereby be ensured within the entry limit. Moving the pieces of routing information having the advertisement inexecution flag set therein to the save routing table enables a registration state where the routing table 113 have only pieces of routing information to undergo the route advertisement.

A default route setting process in this exemplary embodiment will be described by using a flowchart illustrated in FIG. 5.

In this exemplary embodiment, there is a case where multiple default routes are set in the routing table 113 of the edge router 11. Accordingly, this process is designed to decide priority in the multiple default routes, at least the top priority default route.

To achieve this, the default-route setting unit 313 in the routing controller 31 performs processing described below on each edge router 11. Specifically, the default-route setting unit 313 acquires every piece of session information from the session table 114 of the processing target edge router 11 (step S121). The default-route setting unit 313 then calculates the traffic of each piece of routing information in the same manner as in steps S112 and S113 in the advertisement count reduction process (step S122) and extracts the piece of routing information having the lowest traffic from among the pieces of routing information (step S123). The route management unit 111 sets the extracted piece of routing information as a piece of routing information representing the top priority default route in accordance with the instruction from the default-route setting unit 313 (step S124). In this exemplary embodiment, a setting operation is performed in such a manner that a smaller value indicating the priority is assigned a higher priority.

Figure 5:
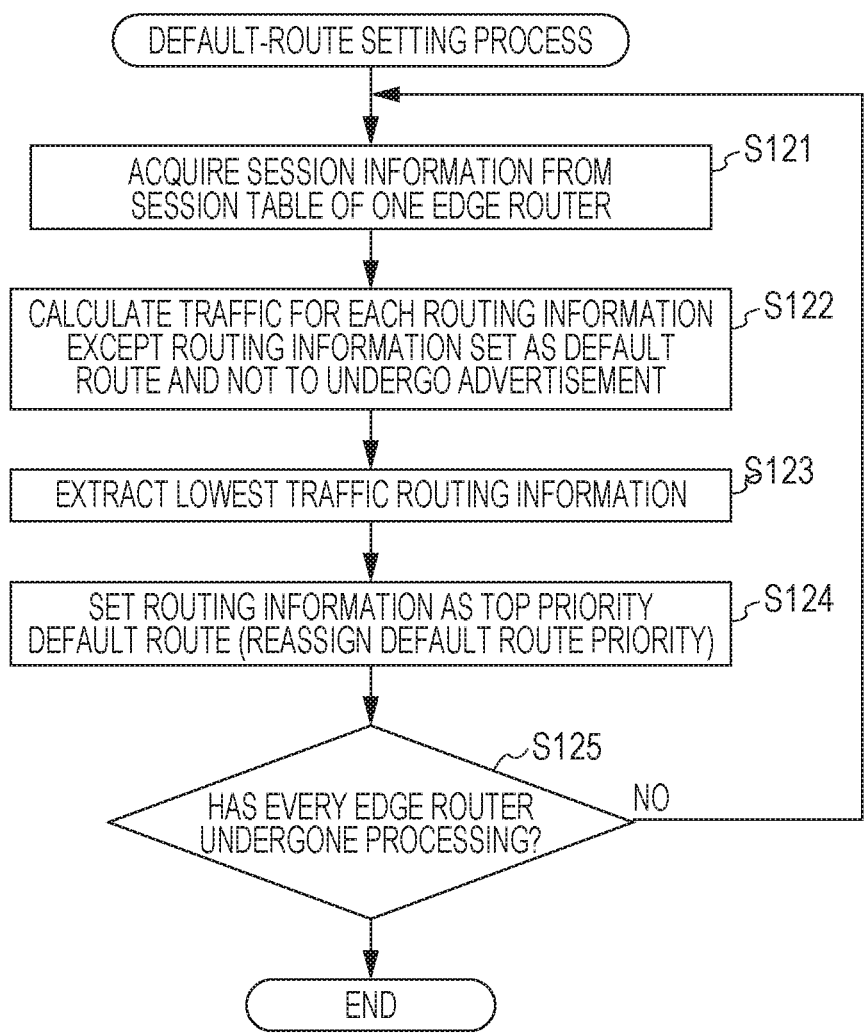
FIG. 5 is a flowchart illustrating a default-route setting process in this exemplary embodiment.

Although not being illustrated in FIG. 5, reassigning is performed to lower the priority one by one in order in the existing default routes, involved with the setting of the top priority default route. The processing described above is repeated until every edge router 11 undergoes the processing (NO in step S125). After the top priority default route is set for every edge router 11 (YES in step S125), the default route setting process is terminated.

As described above, the piece of routing information having the lowest traffic is set to represent a default route in this exemplary embodiment. Setting the piece of routing information having the lowest traffic as the piece of routing information representing the top priority default route results in low load on a router (that is, the router identified by a next hop address) serving as a destination in the relay in this default route. Accordingly, even if the load is increased due to the setting as the default route, trouble is less likely to occur. The description with reference to FIG. 5 is limited to the process for setting the top priority default route; however, if any change such as a deletion of an entry is made to a piece of routing information set as the default route, the priority needs to be reassigned appropriately.

In this exemplary embodiment, to reduce the count of advertisements to the router 21, processing is performed with the two level thresholds provided for each of the edge router 11 and the router 21; however, the number of levels do not necessarily have to be two. Nevertheless, in the case of one level, if only the process in which as illustrated in FIG. 4A, pieces of routing information not used for communication are set not to undergo the route advertisement is performed, a small number of pieces of routing information not used for communication are likely to cause ineffective advertisement count reduction. Accordingly, in the case of one level, it is preferable that the processing for setting the piece of routing information having the lowest traffic not to undergo the route advertisement as illustrated in FIG. 4B be repeated until it is projected that the route count in the routing table 211 does not exceed the maximum number of entries.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A relay system comprising:
   a first relay device;
   a second relay device that receives route advertisement from the first relay device;
   a controller that, if the number of pieces of routing information to undergo the route advertisement among the pieces of routing information registered in the routing table of the first relay device exceeds a predetermined first threshold smaller than the maximum number of pieces of routing information registrable in the routing table of the first relay device, or if the number of pieces of routing information to undergo the route advertisement among the pieces of routing information registered in the routing table of the second relay device exceeds a predetermined second threshold smaller than the maximum number of pieces of routing information registrable in the routing table of the second relay device, collates the pieces of routing information registered in the routine table of the second relay device with pieces of session information registered in a session table that holds pieces of information regarding respective sessions relayed by the first relay device and sets, as a piece of routing information set not to undergo the route advertisement from the first relay device to the second relay device, a piece of routing information that is not referred to in establishment of any of the sessions; and a CPU of the first relay that performs the route advertisement to the second relay device after excluding, from pieces of routing information registered in a routing table of the first relay device, the piece of routing information set not to undergo the route advertisement.

2. The relay system according to claim 1, wherein the controller acquires traffic in each of the sessions from the session table, and wherein if the number of pieces of routing information to undergo the route advertisement among the pieces of routing information registered in the routing table of the first relay device exceeds a third threshold smaller than the maximum number of pieces of routing information registrable in the routing table of the first relay device and larger than the first threshold, or if the number of pieces of routing information to undergo the route advertisement among the pieces of routing information registered in the routing table of the second relay device exceeds a fourth threshold smaller than the maximum number of pieces of routing information registrable in the routing table of the second relay device and larger than the second threshold, the controller aggregates the traffic of the sessions for each piece of routing information and subsequently performs a setting operation for causing a piece of routing information that has the lowest traffic not to undergo the route advertisement to the second relay device.

3. The relay system according to claim 1, wherein the controller acquires, from a session table that holds pieces of information regarding the respective sessions, traffic in each of sessions relayed by the first relay device, if the number of pieces of routing information to undergo the route advertisement among the pieces of routing information registered in the routing table of the first relay device exceeds a third threshold smaller than the maximum number of pieces of routing information registrable in the routing table of the first relay device, or if the number of pieces of routing information to undergo the route advertisement among the pieces of routing information registered in the routing table of the second relay device exceeds a fourth threshold smaller than the maximum number of pieces of routing information registrable in the routing table of the second relay device, the controller aggregates the traffic of the sessions for each piece of routing information and subsequently performs a setting operation for causing the piece of routing information that has the lowest traffic not to undergo the route advertisement to the second relay device.

4. The relay system according to claim 2, wherein until the number of pieces of routing information to undergo the route advertisement among the pieces of routing information registered in the routing table of the first relay device becomes smaller than or equal to the third threshold, or until the number of pieces of routing information to undergo the route advertisement among the pieces of routing information registered in the routing table of the second relay device becomes smaller than or equal to the fourth threshold, the controller repeats the setting operation for causing the piece of routing information that has the lowest traffic not to undergo the route advertisement to the second relay device.

5. The relay system according to claim 3, wherein until the number of pieces of routing information to undergo the route advertisement among the pieces of routing information registered in the routing table of the first relay device becomes lower than or equal to the third threshold, or until the number of pieces of routing information to undergo the route advertisement among the pieces of routing information registered in the routing table of the second relay device becomes lower than or equal to the fourth threshold, the controller repeats the setting operation for causing the piece of routing information that has the lowest traffic not to undergo the route advertisement to the second relay device.

6. The relay system according to claim 1, wherein if the piece of routing information for which the controller has made a decision that the piece of routing information is not to undergo the route advertisement to the second relay device represents a default route, the controller cancels the decision.

7. The relay system according to claim 2, wherein if the piece of routing information for which the controller has made a decision that the piece of routing information is not to undergo the route advertisement to the second relay device represents a default route, the controller cancels the decision.

8. The relay system according to claim 3, wherein if the piece of routing information for which the controller has made a decision that the piece of routing information is not to undergo the route advertisement to the second relay device represents a default route, the controller cancels the decision.

9. The relay system according to claim 4, wherein if the piece of routing information for which the controller has made a decision that the piece of routing information is not to undergo the route advertisement to the second relay device represents a default route, the controller cancels the decision.

10. The relay system according to claim 1, wherein the controller changes, to a route via a default route, a route using the piece of routing information for which the controller has made a decision that the piece of routing information is not to undergo the route advertisement to the second relay device.

11. The relay system according to claim 2, wherein the controller changes, to a route via a default route, a route using the piece of routing information for which the controller has made a decision that the piece of routing information is not to undergo the route advertisement to the second relay device.

12. The relay system according to claim 3, wherein the controller changes, to a route via a default route, a route using the piece of routing information for which the controller has made a decision that the piece of routing information is not to undergo the route advertisement to the second relay device.

13. The relay system according to claim 4, wherein the controller changes, to a route via a default route, a route using the piece of routing information for which the controller has made a decision that the piece of routing information is not to undergo the route advertisement to the second relay device.

14. The relay system according to claim 2,
wherein if there are a plurality of pieces of routing information having the lowest traffic, the controller sets one of the pieces of routing information having the lowest traffic not to undergo the route advertisement to the second relay device, the piece of routing information being received by the first relay device.

15. The relay system according to claim 3,
wherein if there are a plurality of pieces of routing information having the lowest traffic, the controller sets one of the pieces of routing information having the lowest traffic not to undergo the route advertisement to the second relay device, the piece of routing information being received by the first relay device.

16. The relay system according to claim 2,
wherein the controller sets the piece of routing information having the lowest traffic among the pieces of routing information registered in the routing table of the first relay device as the piece of routing information representing a top priority default route.

17. The relay system according to claim 3,
wherein the controller sets the piece of routing information having the lowest traffic among the pieces of routing information registered in the routing table of the first relay device as a piece of routing information representing a top priority default route.

18. A relay device comprising:
a memory that stores a routing table; and
a CPU connected to the memory,
the CPU performs route advertisement of a piece of routing information registered in the routing table to a different relay device,
wherein if the number of pieces of routing information to undergo the route advertisement among the pieces of routing information registered in the routing table exceeds a predetermined first threshold smaller than the maximum number of pieces of routing information registrable in the routing table, or if the number of pieces of routing information to undergo the route advertisement among the pieces of routing information registered in the routing table of the different relay device exceeds a predetermined second threshold smaller than the maximum number of pieces of routing information registrable in the routing table of the different relay device, the pieces of routing information registered in the routing table of the different relay device with pieces of session information registered in a session table that holds pieces of information regarding respective sessions relayed by the CPU are collated to set, as a piece of routing information set not to undergo the route advertisement to the different relay device, a piece of routing information that is not referred to in establishment of any of the sessions,
wherein the CPU performs the route advertisement to the different relay device after excluding one or more pieces of routing information registered in the routing table stored in the memory.

19. A non-transitory computer readable medium storing a program causing a CPU of a computer to execute a process comprising:
collating the pieces of routing information registered in a routing table of a second relay device with pieces of session information registered in a session table that holds pieces of information regarding respective sessions relayed by a first relay device and setting, as a piece of routing information set not to undergo the route advertisement from the first relay device to the second relay device, a piece of routing information that is not referred to in establishment of any of the sessions if the number of pieces of routing information to undergo the route advertisement among the pieces of routing information registered in the routing table of the first relay device exceeds a predetermined first threshold smaller than the maximum number of pieces of routing information registrable in the routing table of the first relay device, or if the number of pieces of routing information to undergo the route advertisement among the pieces of routing information registered in the routing table of the second relay device exceeds a predetermined second threshold smaller than the maximum number of pieces of routing information registrable in the routing table of the second relay device; and
performing the route advertisement to the second relay device after excluding, from pieces of routing information registered in a routing table of the first relay device, a piece of routing information set not to undergo the route advertisement in the controlling of the number of pieces of routing information.

* * * * *